United States Patent
Das et al.

(10) Patent No.: US 10,901,628 B2
(45) Date of Patent: Jan. 26, 2021

(54) METHOD FOR OPERATING STORAGE DRIVES, AND SYSTEM THEREOF

(71) Applicant: Wipro Limited, Bangalore (IN)

(72) Inventors: Rishav Das, Howrah (IN); Maulik Yagnik, Doddanagamangala (IN)

(73) Assignee: Wipro Limited, Bangalore (IN)

( * ) Notice: Subject to any disclaimer, the term of this patent is extended or adjusted under 35 U.S.C. 154(b) by 19 days.

(21) Appl. No.: 16/370,347

(22) Filed: Mar. 29, 2019

(65) Prior Publication Data

US 2020/0293200 A1 Sep. 17, 2020

(30) Foreign Application Priority Data

Mar. 12, 2019 (IN) .............................. 201941009487

(51) Int. Cl.
*G06F 12/00* (2006.01)
*G06F 3/06* (2006.01)

(52) U.S. Cl.
CPC .......... *G06F 3/0616* (2013.01); *G06F 3/0644* (2013.01); *G06F 3/0676* (2013.01); *G06F 3/0679* (2013.01)

(58) Field of Classification Search
CPC .... G06F 3/0616; G06F 3/0644; G06F 3/0676; G06F 3/0679
See application file for complete search history.

(56) References Cited

U.S. PATENT DOCUMENTS

| | | | |
|---|---|---|---|
| 5,495,601 A * | 2/1996 | Narang | G06F 16/2379 |
| 5,819,100 A | 10/1998 | Pearce | |
| 5,828,583 A | 10/1998 | Bush et al. | |
| 6,330,641 B1 * | 12/2001 | Yoshioka | G06F 12/0866 711/111 |
| 8,316,263 B1 | 11/2012 | Gough et al. | |
| 8,443,136 B2 * | 5/2013 | Frost | G06F 12/0246 711/103 |
| 9,244,790 B1 * | 1/2016 | Ma | G06F 11/2221 |
| 9,658,784 B1 * | 5/2017 | Ahmad | G11B 5/00813 |
| 2009/0037679 A1 * | 2/2009 | Kaushik | G06F 3/067 711/162 |
| 2016/0292025 A1 * | 10/2016 | Gupta | G06F 11/008 |
| 2018/0067697 A1 * | 3/2018 | Lee | G06F 3/0656 |
| 2018/0143762 A1 * | 5/2018 | Kim | G06F 11/008 |

* cited by examiner

*Primary Examiner* — Prasith Thammavong
(74) *Attorney, Agent, or Firm* — Finnegan, Henderson, Farabow, Garrett & Dunner, LLP

(57) ABSTRACT

The present disclosure relates to method and system for operating storage drives to increase lifecycle of the storage drives. A drive manager receives a plurality of parameters of a plurality of storage drives and determines operational state of one or more storage drives from the plurality of storage drives as unhealthy. Further, the drive manager identifies an application frequently retrieving data from the one or more storage drives and further determines one or more memory locations in the one or more storage drive from where the data is retrieved frequently. Thereafter, the data present in the one or more memory locations are stored in a temporary storage and is provided to the application during a future data retrieval cycle. Thus, the application may not retrieve data from the one or more storage drives. Hence, the lifecycle of the one or more storage drives can be increased.

18 Claims, 5 Drawing Sheets

METHOD FOR OPERATING STORAGE DRIVES, AND SYSTEM THEREOF

TECHNICAL FIELD

The present disclosure relates to storage drive control system. More particularly, the present disclosure relates to System and method for increasing life cycle of storage device.

BACKGROUND

Data storage is a key operation in industries and enterprises. Generally, enterprises and cloud computing systems demand high performance storage. Thus, maintaining health of storage drives is imperative as data may be lost if a storage drive deteriorates. Storage of data in the storage drives is increasing continuously with advent of wide number of applications. Currently, most of the data is stored in either enterprise storage drives or cloud storage, resulting into increase in frequency of data access as well. Generally, increase in frequency of data access from storage drives more likely results into deterioration of storage drives.

Typically, the two types of storage drives are used, viz., Hard Disk Drive (HDD) and Static Storage Drives (SSD). In HDD a disk comprising a plurality of memory locations rotates and a read/write head reaches a specific memory location and access data in the memory location. In a typical HDD, a read operation or a write operation consumes more time compared to SSD. As number of read/write operations increases, the movement of the read/write head increases, thereby decreasing life of the HDD.

In SSD, transistors are used to store data. Although, SSD is fast compared to HDD, frequently accessing the storage drive for example frequently changing voltage values of the transistors reduces the efficiency of transistors, thereby reducing life of the SSD.

Therefore, there is a need to develop a method and a system to increase the lifecycle of the storage drives irrespective of type of storage drives.

The information disclosed in this background of the disclosure section is only for enhancement of understanding of the general background of the invention and should not be taken as an acknowledgement or any form of suggestion that this information forms the prior art already known to a person skilled in the art.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

In an embodiment, a method is disclosed for operating storage drives. The method may comprise receiving a plurality of parameters associated with a plurality of storage drives. Each storage drive may be configured to store data. Further, the method may comprise determining operating state of one or more storage drives from the plurality of storage drives as unhealthy. Thereafter, the method may comprise identifying an application frequently retrieving data from the one or more storage drives. Further, the method may comprise determining memory locations in the one or more storage drives, from where the data is retrieved frequently, and store the data present in the memory locations in a temporary storage. Furthermore, the method may comprise providing the data from the temporary storage to the application for further data retrieval. Thus, the read operation on the one or more storage drives may be reduced, thereby increasing the lifecycle of the one or more storage drives.

In an embodiment, a system is disclosed for operating storage drives. The system (also referred as drive manager) may be configured to receive a plurality of parameters associated with a plurality of storage drives. Each storage drive may be configured to store data. Further, the drive manager may be configured to determine operating state of one or more storage drives from the plurality of storage drives as unhealthy. The drive manager may be further configured to identify an application frequently retrieving data from the one or more storage drives. Further, the drive manger may be configured to determine memory locations in the one or more storage drives, from where the data is retrieved frequently, and the drive manager may further store the data present in the memory locations in a temporary storage and may be configured to provide the data from the temporary storage to the application for further data retrieval. Thus, the read operation on the one or more storage drives may be reduced, thereby increasing the lifecycle of the one or more storage drives.

In an embodiment, a non-transitory computer-readable medium is disclosed for operating storage drives. The computer-readable medium may comprise a processor that causes a device to perform one or more functions. The one or more functions may comprise receiving a plurality of parameters associated with a plurality of storage drives. Each storage drive may be configured to store data. Further, the one or more functions may comprise determining operating state of one or more storage drives from the plurality of storage drives as unhealthy. Thereafter, the one or more functions may comprise identifying an application frequently retrieving data from the one or more storage drives. Further, the one or more functions may comprise determining memory locations in the one or more storage drives, from where the data is retrieved frequently, and store the data present in the memory locations in a temporary storage. Furthermore, the one or more functions may comprise providing the data from the temporary storage to the application for further data retrieval. Thus, the read operation on the one or more storage drives may be reduced, thereby increasing the lifecycle of the one or more storage drives.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 1:
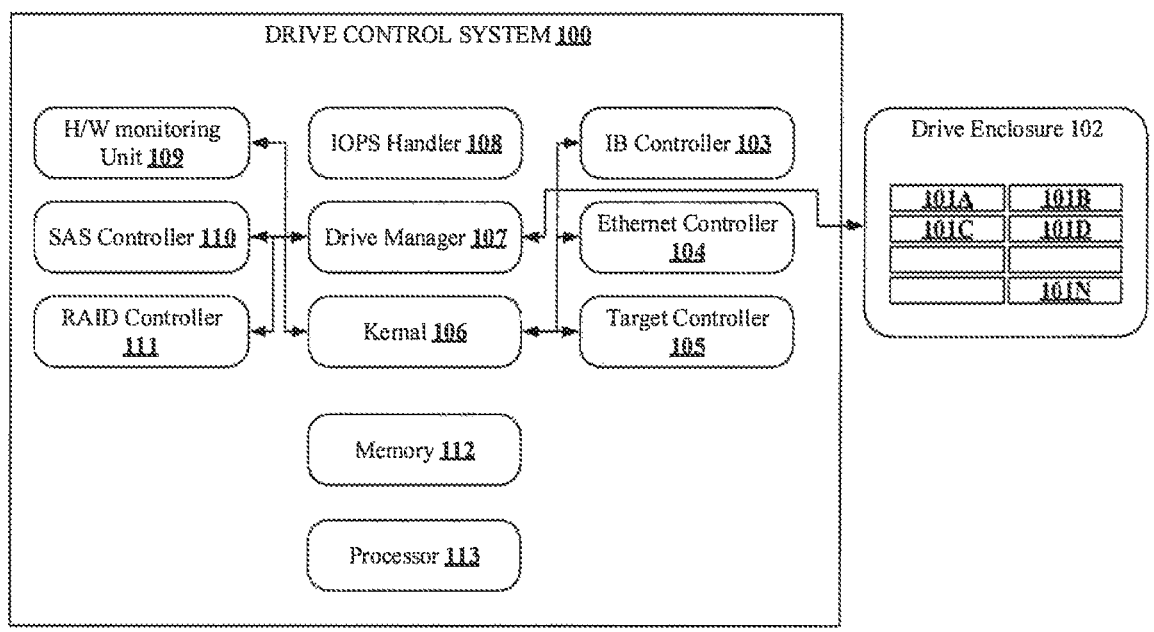
FIG. 1 illustrates an environment for operating the storage drives, in accordance with an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "includes", "comprising", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or apparatus.

Embodiments of the present disclosure relate to method and system for operating storage drives in order to increase the lifecycle of the storage drives. The proposed method of the disclosure includes a drive manager that receives a plurality of parameters associated with a plurality of storage drives and determines operational state of one or more storage drives from the plurality of storage drives as unhealthy. Further, the drive manager identifies an application frequently retrieving data from the one or more storage drives and further determines memory locations in the one or more storage drive from where the data is retrieved frequently by the application. Thereafter, the data present in the memory locations are stored in a temporary storage and are provided to the application during a future data retrieval cycle. Thus, the application may not retrieve data from the one or more storage drives. Hence, the lifecycle of the one or more storage drives may be increased.

FIG. 1 illustrates an environment for controlling storage drives. As shown, the environment includes a plurality of storage drives (101A, 101B, . . . 101N). The plurality of storage drives (101A, 101B, . . . 101N) may also be referred as storage drives (101). The storage drives (101) may be enclosed in a drive enclosure (102). The storage drives (101) may be operated and controlled by a drive control system (100). The drive control system (100) may include of a plurality of components, including but not limited to, Infiniband (1B) Controller (103), an Ethernet controller (104), a target controller (105), a kernel (106), a drive manager (107), Input Output Per Second (IOPS) handler (108), hardware (H/W) monitoring unit (109), Serial Attached SCSCI (SAS) controller (110) and Redundant Array of Independent Disks (RAID) controller (111), a memory (112) and a processor (113).

In an embodiment, the IB controller (103) may help in communicate between the components of the drive control system (100) and also may provide the data from one component to another component. In an embodiment, the drive manager (107) may facilitate managing Input Output Per Second (IOPS) and retrieval or storing the IOPS in storage drives (101). In an embodiment, the Ethernet controller (104) may manage Ethernet ports or other front-end ports in the drive control system (100) for managing the IOPS. In an embodiment, the SAS controller (110) may establish the physical link between the storage drives (101) and components of the drive control system (100). The SAS controller (110) may also include a SAS expander which may help in creating lanes or expanding existing lanes to many storage drives (101) from the SAS expander. In an embodiment, the RAID controller (111) may be a protection system for the storage drives (101). In one embodiment, there may be different types of RAID levels which may be used to protect the data in the storage drives during a failure state of the storage drives (101). In one embodiment, the IOPS handler (108) may facilitate internal IOPS management which may vary based on type of storage drives (101). The storage drives (101) may have a block storage architecture or a file storage architecture. The IOPS handler (108) may use different mechanism of transporting IOPS the storage drives (101) depending on the architecture type of the storage drives (101).

In an embodiment, the H/W monitoring unit (109) may monitor hardware links of the storage drives (101) and may ensure that the storage drives (101) may be operated in a healthy operating state in case of hardware failures. The H/W monitoring unit (109) may inform a management server to manage a substitute hardware in case of hardware failures. In an embodiment, the memory (112) may be associated with the processor (113), storing instructions of each component. In an embodiment, the processor (113) may facilitate to execute the instructions stored in the memory (112).

In an embodiment, the environment may be an enterprise or a cloud platform. In an embodiment, the drive manager (107) may be configured in an orchestrator layer of the cloud platform.

Figure 2:
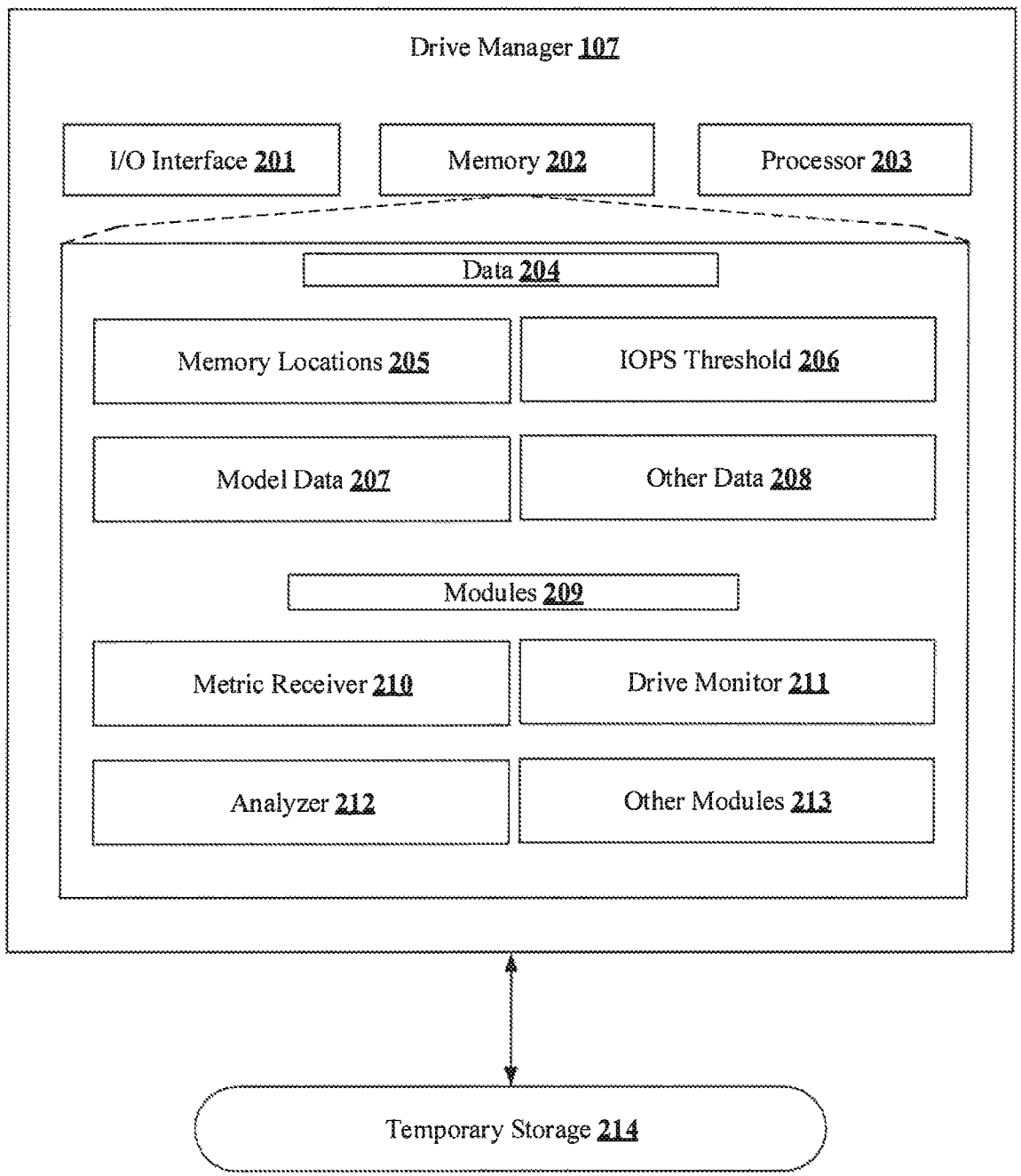
FIG. 2 shows an exemplary block diagram of internal elements of a drive manager for operating the storage device for increasing lifecycle of storage drives, in accordance with an embodiment of the present disclosure.

FIG. 2 illustrates internal architecture of the drive manager (107) in accordance with some embodiments of the present disclosure. The drive manager (107) may include at least one processor ("CPU" or "processor") (203) and a memory (202) storing instructions executable by the processor (203). The processor (203) may include at least one data processor for executing program components for executing user or system-generated requests. The memory (202) is communicatively coupled to the processor (203). The drive manager (107) further includes an Input/Output (I/O) interface (201). The I/O interface (201) is coupled with the processor (203) through which an input signal or/and an output signal is communicated. In an embodiment, the I/O interface (201) may enable communication between different module (209) of the drive manager (107). In an embodiment, the drive manager (107) may use the memory (112) which is located external to the drive manager (107) or may have a dedicated memory (202).

In an embodiment, data (204) may be stored within the memory (202). The data (204) may include, for example, memory locations (205), IOPS threshold (206), model data (207) and other data (208).

In an embodiment, the memory locations (205) may refer locations of memory in one or more storage drives from the storage drives (101), having an operating status as unhealthy.

In an embodiment, the IOPS threshold (206) may refer to a threshold value for IOPS beyond which the storage drive may be considered as unhealthy storage drive. For example, a drive having an IOPS value greater than the IOPS threshold, may be considered as having an unhealthy operational state. The IOPS value of a storage drive may be determined by measuring by number of read/write operations performed on the storage drive. IOPS may be used to measure throughput of the storage drive.

In an embodiment, the model data (207) may include but is not limited to training data for training a machine learning model or a deep learning model like Long Short-Term Memory (LSTM), training results and analysis, user inputs during training, weights, encoding and decoding techniques, and the like. The model data (207) may be used for predicting a score for each storage drive from the storage drive (101). Also, the model data (207) may be used for predicting a process from an application frequently retrieving data from a storage drive having an unhealthy operating state.

In an embodiment, the other data (208) may include threshold values for each parameter associated with each storage drive. The other data (208) may also include performance parameters of the storage drives.

In an embodiment, the data (204) in the memory (202) is processed by modules (209) of the drive manager (107). In an embodiment, the modules (209) may be a part of the memory (202). Alternatively, the modules (209) may be implemented independently (outside the memory (202). Such implementations may include but are not limited to technologies like Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules 209 when configured with the functionality defined in the present disclosure will result in a novel hardware.

In one implementation, the modules (209) may include, for example, a metric receiver (210), a drive monitor (211), an analyzer (212) and other modules (213). It will be appreciated that such aforementioned modules 209 may be represented as a single module or a combination of different modules. In an embodiment, each module 209 may be a part of the processor (203) or each module (209) may be an individual circuit or individual computing unit.

In an embodiment, the metric receiver (210) is configured to receive a plurality of parameters associated with the storage drives (101). In an embodiment, the plurality of parameters may include at least one of but not limited to, Read Error Rate (RER), throughout performance, temperature, Mean Time Between Failures (MTBF), spin-up time, Reallocated Sectors Count (RSC), spin retry count, end-to-end error, current pending sector count, un-correctable sector count, soft read error rate counter detected and Input Output Per Second (IOPS). In an embodiment, the IOPS of each storage drive is received and are broken into chunks of data. Each IOPS is assigned a logical address. Further, the metric receiver (210) is configured to de-duplicate and compress the IOPS of the storage drives (101) to reduce memory.

In an embodiment, the drive monitor (211) may be configured to select one or more parameters from the plurality of parameters for determining operation status of a storage drive as unhealthy. The one or more parameters may be selected if a value associated with the at least one parameter is beyond a predefined threshold value. Further, a plurality of clusters of the storage drives (101) is generated. Each cluster may include storage drives associated with the one or more parameters. In an embodiment, the drive monitor (211) may further assist the analyzer (212) in predicting operating status of the storage drives. Further, the drive monitor (211) may also be configured to retrieve the data from the storage drives (101) and store in the temporary storage (214). In an embodiment, the drive monitor (211) may interact with the temporary storage (214) using protocols including, but not limited to, Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, 12C, SPI, Microwire, 1-Wire, IEEE 1284, Intel QuickPathInterconnect, InfiniBand, PCIe, etc using standard data connections means such as wireless or wired networks. In an embodiment, the drive monitor (211) may be further configured to determine a plurality of processes of an application frequently retrieving data from the one or more storage drives.

In a further embodiment, the drive monitor (211) may be configured to determine a first set of processes and a second set of processes, where the second set of processes may be dependent on an outcome of the first set of processes. In an embodiment, the first set of processes may be a parent process and the second set of processes may be a child process. The parent process may initiate the child process. In another embodiment, the first set of processes and the second set of processes may be interdependent. In an example, consider that a process B is dependent on an outcome of process A. Based on the outcome of process A, the process B may access a particular memory location in the storage drive (101). Thus, the drive monitor (211) may cluster the plurality of processes into the first set of processes and the second set of processes.

In an embodiment, the analyzer (212) may be configured to predict a score for each storage drive in each cluster generated by the drive monitor (211) using the one or more parameters. In one embodiment, the analyzer (212) uses a machine learning or deep learning model to predict the score. The score is further used by the drive monitor (211) to predict operating status of the one or more storage drives. For example, the drive monitor (211) may compare a score of a storage drive (for example 101A) with a threshold score. If the score of the storage drive is less than the threshold score, the storage drive (for example 101A) may be considered to have operating status that is unhealthy and is not conducive for read/write operations. In one embodiment, the score of a storage drive (101) may indicate a health parameter of the storage drive (101). In one embodiment, higher the value of the score may indicate a storage drive that is healthy, and the drive may be used for read/write operations without effecting the operational performance. For example, if a score may range from "1-10", a score of "1" may indicate that health of a storage drive (101) is poor and a score of "10" may indicate that health of the storage drive (101) is good. In another embodiment, the score of "1" may indicate a good health and a score of "10" may indicate a poor health, and, the result of comparison may be analysed accordingly.

In an embodiment, the analyzer (212) may be further configured to determine an association between the first set of process and the second set of process. Further, the analyzer (212) may be configured to recognize a pattern of retrieving data from the one or more storage drives by the first set of processes for a predefined time interval. In another embodiment, the analyzer (212) may be configured to recognize a pattern of retrieving data from the one or more storage drives by the second set of processes for a predefined time interval. Based on the recognized pattern and the association between the first set of process and the second set of processes, the analyzer (212) is further configured to predict at least one process from the second set of process which is more likely to retrieve data from the storage drive (101). In an embodiment, the analyzer (212) may train the LSTM model to identify the association between the first set of processes and the second set of processes.

In an embodiment, the other modules (213) may include a driver module. In an embodiment, driver module may be configured to provide the plurality of parameters to the metric receiver (210). The driver may communicate with the metric receiver (210) using protocols including, but not limited to, Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, 12C, SPI, Microwire, I-Wire, IEEE 1284, Intel QuickPathInterconnect, InfiniBand, PCIe etc using standard data connections means such as wireless or wired.

Figure 3:
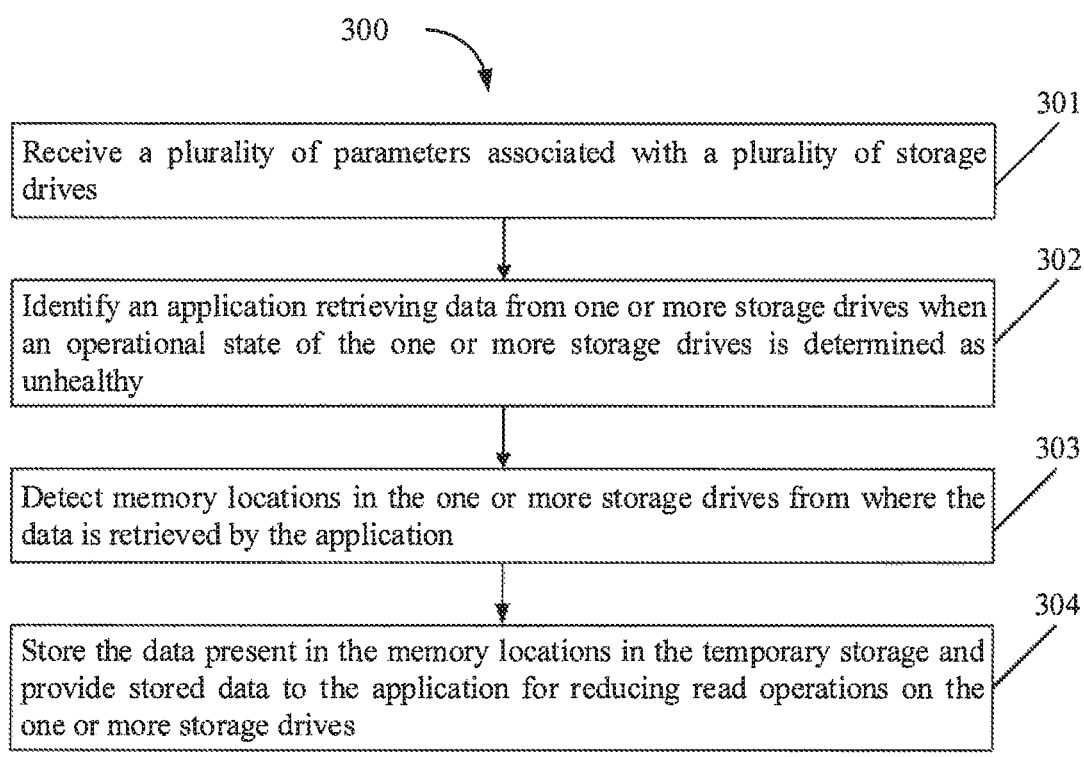
FIG. 3 shows an exemplary flow chart for operating the storage device for increasing lifecycle of storage drives, in accordance with an embodiment of the present disclosure.

FIG. 3 shows a flow chart illustrating a method (300) for operating storage derives (101) for increasing lifecycle of the storage drives (101), in accordance with some embodiments of the present disclosure.

As illustrated in FIG. 3, the method (300) may include one or more steps. The method (300) may be described in the general context of computer executable instructions. Generally, computer executable instructions may include routines, programs, objects, components, data structures, procedures, modules, and functions, which perform particular functions or implement particular abstract data types.

The order in which the method (300) is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step (301), the metric receiver (210) may be configured to receive the plurality of parameters associated with the storage drives (101) from the driver module. Typically, different parameters associated with the storage drive (101) may be represented in different formats. In an embodiment, the metric receiver (210) may convert the values of the plurality of parameters to a format compatible with the drive monitor (211) and the analyzer (212). Further, the metric receiver (210) may arrange the plurality of parameters in the memory (202) and provide the plurality of parameters to the drive monitor (211) in an order such that even when values of the plurality of parameters are updated over time, the correct values are provided to the drive monitor (211). The driver monitor (211) identifies one or more storage drives from plurality of storage drives as unhealthy using steps as illustrated in FIG. 4.

Figure 4:
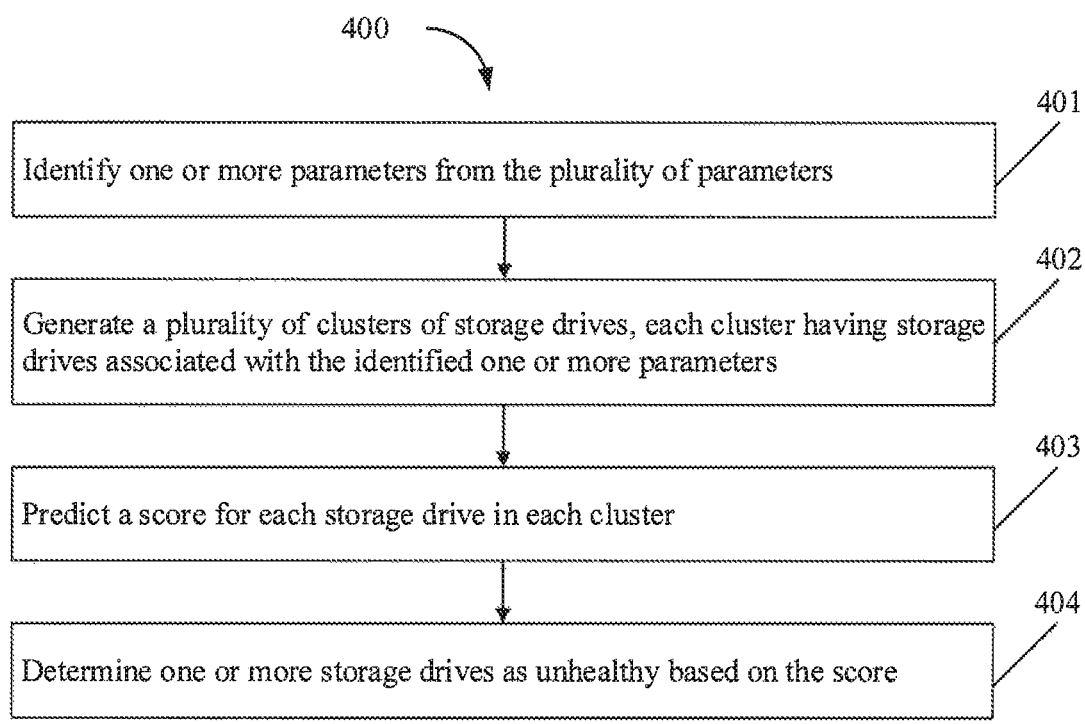
FIG. 4 shows an exemplary flow chart for operating the storage device for determining unhealthy storage drives, in accordance with an embodiment of the present disclosure.

Reference is now made to FIG. 4. At step (401), the drive monitor (211) may identify one or more parameters from the plurality of parameters having a value beyond the predefined threshold value. For example, the IOPS of a storage drive (101A) may be beyond a threshold value, thus indicating that the health of the storage drive (101A) is deteriorating. Likewise, each parameter from the plurality of parameters may be compared with corresponding threshold value by the drive monitor (211). Further, the drive monitor (211) identifies one or more storage drives having at least one parameter beyond corresponding threshold value.

At step (402), the drive monitor (211) generates a plurality of clusters of the one or more storage drives. In one embodiment, the one or more storage drives having a particular parameter beyond corresponding threshold value may be clustered together. In another embodiment, one or more storage drives having similar/same number of parameters whose values are more than corresponding threshold values are clustered together. A person skilled in the art should appreciate that the clusters may be generated in many ways, and the present disclosure may envisage all possible clusters of one or more storage drives based on the one or more parameters. In an embodiment, known clustering techniques may be used to generate the clusters.

At step (403), the analyzer (212) receives the cluster of the one or more drives (101) from the drive monitor (211) and predicts a score for each storage drive in each cluster. In an embodiment, the score may indicate a health status of the one or more storage drives. In an embodiment, the analyzer (212) may consider the one or more parameters of the one or more storage drives as a neuron of a neural network for predicting a score. In an embodiment, the parameters which help in deciding the health of the one or more storage drives may be considered as a neuron. For example, a new storage drive (101) may have zero or negligible wear cycles hence wear level values may not be considered for new drives, whereas for older drives wear levels may be the important factor for predicting health state of the drives.

In an embodiment, the prediction may be performed by the neural network where an input layer may hold the neuron representing all the parameters which are selected by drive monitor (211). The number of input neurons may depend on the number of parameters selected. An output layer may be a single layer, which may provide the score of the one or more drives (101) of a cluster. A hidden layer may be calculated based on Dough's empirical formula. The hidden layer may include a plurality of hidden neurons, which may be a weight and a bias applied to the input neurons in neural net iterations. In an embodiment, initially, the input neurons may be taken into feedforward techniques, based on a prediction of a feedforward layer. A loss function may be used to calculate an error. The error may be provided as a feedback for learning and correcting the output based on the error. In an embodiment, the error may be back-propagated with a weight and a bias. During a next iteration, the error may be reduced due to the back-propagation. In an example embodiment, sum of the square errors is used, where loss is represented as shown in equation (1):

$$(y, Y) = \Sigma(y - y\hat{\,})2 \tag{1}$$

Based on the above, the Derivative of Loss may be determined based on the equation (2):

$$\text{Derivative Loss} = 2(y - y\hat{\,}) * z(1-z) * x \tag{2}$$

Where,
x=input vector
y=output vector;
Y=mean value of y; and
z=hidden layer vector Utilizing the loss function, a gradient and the error may be detected. The gradient and the error may be used to back-propagate in order to minimize the error rate in weight and bias. Undergoing "n" times of epoch, the error rate may be minimized, and prediction accuracy may be increased. When highest accuracy is achieved, the analyzer (212) may determine the score of each storage drive in a cluster. The score may represent the state of the one or more storage drives ranging between '0' and '1'. In one embodiment, a score of '0' may represent bad health and a score of '1' may represent good health.

At step (404), the drive monitor (211) may receive the score of each storage drive from each cluster from the analyzer (212) and determine the operating state of the one or more storage drives as unhealthy based on the score of each storage drive.

Figure 5:
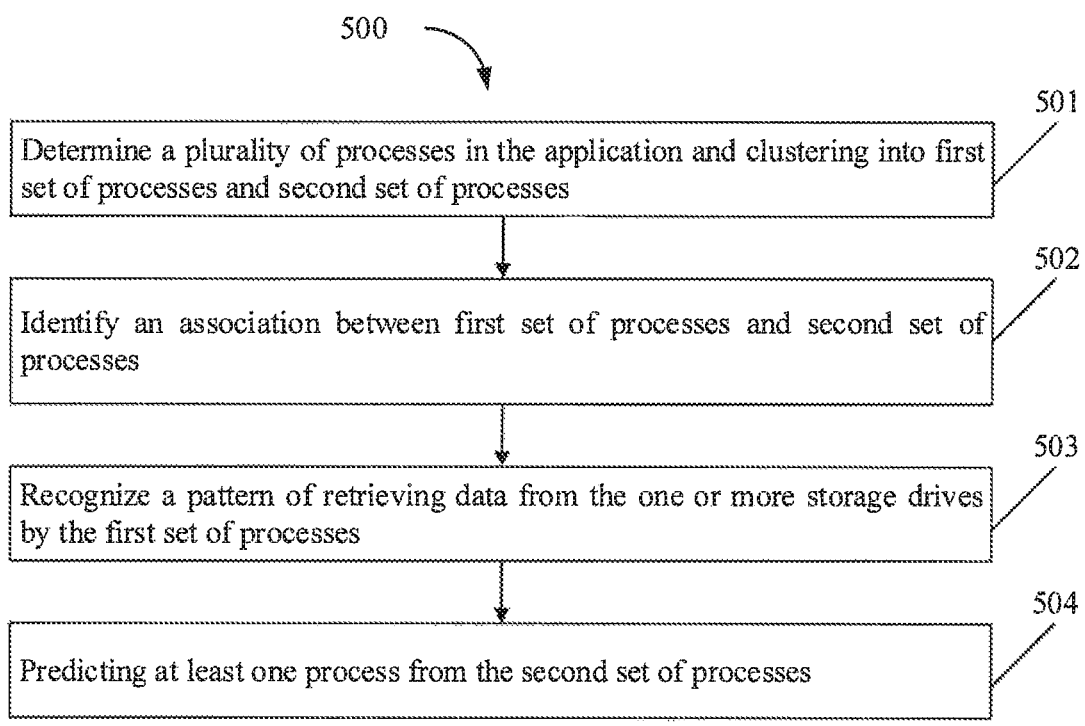
FIG. 5 shows an exemplary flow chart for operating the storage device for predicting processes likely to retrieve data from the storage drives, in accordance with an embodiment of the present disclosure.

Referring back to FIG. 3, at step (302), the drive monitor (211) may identify an application frequently retrieving data from the one or more storage drives determined to be operating in the unhealthy operating state. Reference is now made to FIG. 5 illustrating the method steps of predicting processes in the identified application that may retrieve data from the one or more storage drives. At step (501), the drive monitor (211) may identify a plurality of processes in the application retrieving data from the one or more storage drives in a first retrieval cycle. Further, the drive monitor (211) may cluster the plurality of processes into the first set of processes and second set of processes as described hereinabove in the present disclosure.

At step (502), the analyzer (212) may identify an association between the first set of processes and the second set of processes. The association may indicate how and when the outcome of the first set of processes may impact the second set of processes. For example, a process A may be implemented for completely executing a process B. Thus, process B is dependent on process A. Therefore, an association between the process A and process B may be during the execution of B. In another example process B is implemented only after process A is completed. Thus, the association between process A and process B is established only after execution of process A. In another example, if a single process A is responsible for multi-process communication, such as process B, process C and process D, then the process A may perform parallel communication and duplicate processes which may be in an execution queue may be terminated.

At step (503), the analyzer (212) recognizes a pattern of retrieving data from the one or more storage drives (for example from storage drive (101A)) by the first set of processes. In an embodiment, the pattern may include retrieving data at regular time intervals or retrieving data upon a trigger. The pattern may be recognized by monitoring the first set of processes for a predefined time interval. For example, consider a process A of an application retrieves location data from the storage drive (101A) when other processes of the application require the location data. Thus, the analyzer (212) may recognize that whenever any other process requires location data, the process A will retrieve the location data from the storage drive (101A). Below mentioned formula in the equation (3), may be used to calculate distance between the first set of processes and the second set of processes:

$$D(p,q)=\operatorname{sqrt}\{(q1-p1)2+(q2-p2)2+(q3-p3)2 \ldots n\} \quad (3)$$

Where
p and q may be the two processes;
q1 and q1 may be data points in the processes p and q respectively; and
n may be an integer.

At step (504), the analyzer (212) may predict at least one process from the second set of processes that is likely to retrieve data from the one or more storage drives based on the association between the first set of processes and the second set of processes, and the recognized pattern. The second set of processes may be system-oriented process or IOPS transactional process which may be requested by end users or may be child process/sub-processes. For example, considering a travel application having different options such as menus, hotels, flights, trains based on geographical location. The geographical location is taken as a main input from the user and a specific process is initiated by submitting the location. The specific process includes both transactional patterns as well as operational patterns. Using both the patterns, analyzer (212) predicts the associated sub or child process that are to be executed upon subsequent calling of functions. The sub-processes/child processes further retrieve data from the storage drive (101A) by searching the from an address mapping table and finding an index using hash. Searching includes rotating of disk in HDD or triggering the binary codes in SSD. In case of HDD, the disk rotates until a read/write head reaches the desired index and starts retrieving data, thereafter. While in SSD, the triggering of the binary codes enables retrieval of data. The time taken for searching data in SSD is very less, but more in case of HDD. The analyzer (212) may hold Long and Short-Term Memory (LSTM) network which takes the input from previous timestamp (t−1) and present timestamp i.e., (t) and predict process likely to retrieve data at a future timestamp (t+1) as an output. Hence the LSTM model is very robust for handing this kind of dynamic states. However, the sub process may not appear in few instances or becomes zero since as a result of elimination. Hence, Gradient Recurrent Unit (GRU) LSTM may be used. The GRU LSTM may facilitate solving vanishing gradient issue in LSTM model and improves the accuracy of the model.

The advantage of using GRU LSTM model is that it may identify other child or sub process that may be relevant to another parent process as well. The GRU LSTM may take an input from (t−1) LSTM and further feed into an update gate in order to determine the amount of dataset to be passed. The resultant of the update gate is further provided to reset gate which may allow only relevant dataset and ignore rest of the data. The resultant of the reset gate may be fed into a current memory content where the datasets may be processed and passed through nonlinear activation results predicted output of next set of data to be associated with the current process.

Referring back to FIG. 3, at step (303), the drive monitor (211) determines memory locations of the one or more storage drives from where the predicted at least one process may be likely to retrieve data. In an embodiment, the memory locations may be determined by receiving assistance from the SAS controller (110).

At step (304), the drive monitor (211) may store the data that may be likely to be retrieved, in the temporary storage (214). When the at least one process requests for the data from the storage drive (101), the drive monitor (211) may provide the data from the temporary storage (214) instead of the storage drive (101). Therefore, by reducing number of read operations on the storage drive (101), the lifecycle of the storage drive may be improved.

In an embodiment, the present disclosure increases wear cycle of storage drives (101) by reducing movement of read/write head in a HDD and number of voltage changes in SSD. In an embodiment, the present disclosure reduces number of read operations on storage drives (101) thereby reducing failure of the storage drives (101).

In an embodiment, the present disclosure reduces latency in the storage drives (101) and decreases time for delivering IPOS in the drive control system (100).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article may be described herein, it will be readily apparent that more than one device/article (whether or not they cooperate) may be used in place of a single device/article. Similarly, where more than one device or article may be described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3, FIG. 4 and FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It may be therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Drive control system |
| 101 | Storage drives |
| 102 | Drive enclosure |
| 103 | IB Controller |
| 104 | Ethernet controller |
| 105 | Target controller |
| 106 | Kernel |
| 107 | Drive manager |
| 108 | IOPS handler |
| 109 | H/W monitoring unit |
| 110 | SAS controller |
| 111 | RAID controller |
| 201 | I/O interface |
| 202 | Memory |
| 203 | Processor |
| 204 | Data |
| 205 | Memory locations |
| 206 | IOPS threshold |
| 207 | Model data |
| 208 | Other data |
| 209 | Modules |
| 210 | Metric receiver |
| 211 | Drive monitor |
| 212 | Analyzer |
| 213 | Other modules |

What is claimed is:

1. A method of operating storage drives, comprising:

receiving, by a drive manager, a plurality of parameters associated with a plurality of storage drives, each storing data;

identifying, by the drive manager, an application that is retrieving data from one or more storage drives from the plurality of storage drives in a first data retrieval cycle, when an operational state of the one or more storage drives is determined as unhealthy based on the plurality of parameters;

determining, by the drive manager, a first set of processes and a second set of processes associated with the application that is retrieving data from the one or more storage drives;

predicting, by the drive manager, at least one process from the second set of processes, based on a pattern of retrieving the data from the one or more storage drives by the first set of processes and an association between the first set of processes and the second set of processes, wherein the at least one process indicates a process of the application that is expected to retrieve the data from the one or more storage drives within a time interval;

detecting, by the drive manager, one or more memory locations in the one or more storage drives from where the predicted at least one process is expected to retrieve the data within the time interval; and storing, by the drive manager, the data present in the one or more memory locations in a temporary storage associated with the drive manager, wherein the stored data is provided to the application in a subsequent data retrieval cycle for reducing read operations performed on the one or more storage drives.

2. The method of claim 1, wherein the plurality of parameters comprises at least one of, Read Error Rate (RER), throughput performance, temperature, Mean Time Between Failures (MTBF), spin-up time, Reallocated Sectors Count (RSC), spin retry count, end-to-end error, current pending sector count, un-correctable sector count, TA counter detected and Input Output Per Second (IOPS), wherein the Input Output Per Second (IOPS) for each storage drive is received to detect frequency of data manipulation to predict health of each storage drive.

3. The method of claim 1, further comprising:
identifying one or more parameters from the plurality of parameters having a value beyond a predefined threshold value;
generating a plurality of clusters of storage drives from the plurality of storage drives, wherein each cluster comprises the storage drives associated with the identified one or more parameters;
predicting a score for each storage drive in each of the plurality of clusters using a machine learning model, by providing the identified one or more parameters to the machine learning model as input; and
determining the one or more storage drives from the plurality of clusters as unhealthy when the predicted score of the one or more storage drives is beyond a predefined threshold score.

4. The method of claim 1, further comprising:
determining a plurality of processes in the application that is retrieving the data from the one or more storage drives in the first data retrieval cycle, wherein the plurality of processes is clustered into at least the first set of processes and the second set of processes using Euclidean distance technique;
identifying the association between the first set of processes and the second set of processes, wherein a soft link is created in the temporary storage to associate an outcome of the first set of processes to the second set of processes, wherein the soft link enables the at least one process from the second set of processes to access the data in the temporary storage, wherein the outcome of the first set of processes is a result of executing the application;
recognizing the pattern of retrieving the data from the one or more storage drives by the first set of processes for a pre-defined time interval; and
predicting the at least one process, from the second set of processes, based on the recognized pattern and the association between the first set of processes and the second set of processes, wherein the at least one process is expected to retrieve the data from the one or more storage devices within the time interval using a Long Short-Term Memory (LSTM) model.

5. The method of claim 4, wherein the association between the first set of processes and the second set of processes are identified based on a training of the LSTM model, and wherein the training comprises:
providing a plurality of the first set of processes and the second set of processes;
generating an update gate vector and a reset gate vector for each of the plurality of the first set of processes and the second set of processes based on a weight associated with each process; and
identifying the association between the first set of processes and the corresponding second set of processes based on the update gate vector and the reset gate vector of respective processes.

6. The method of claim 1, wherein the data in the one or more storage drives from the plurality of storage drives, is stored in the temporary storage when a value of IOPS of a storage drive is greater than a predefined IOPS threshold value.

7. A drive manager for operating storage drives, comprising:
a metric receiver configured to receive a plurality of parameters associated with plurality of storage drives, each storing data;
a drive monitor configured to:
identify an application that is retrieving data from one or more storage drives from the plurality of storage drives in a first data retrieval cycle, when an operational state of the one or more storage drives is determined as unhealthy based on the plurality of parameters;
determine a first set of processes and a second set of processes associated with the application that is retrieving data from the one or more storage drives;
predict at least one process from the second set of processes, based on a pattern of retrieving the data from the one or more storage drives by the first set of processes and an association between the first set of processes and the second set of processes, wherein the at least one process indicates a process of the application that is expected to retrieve the data from the one or more storage drives within a time interval;
detect one or more memory locations in the one or more storage drives from where the predicted at least one process is expected to retrieve the data within the time interval;
and
a temporary storage configured to store the data present in the one or more memory locations in the temporary storage associated with the drive manager, wherein the stored data is provided to the application in a subsequent data retrieval cycle for reducing read operations performed on the one or more storage drives, wherein the temporary storage is configured to store de-duplicated data present in a storage drive from the plurality of storage drives when a value of IOPS of the storage drive is greater than a predefined IOPS threshold value.

8. The drive manager of claim 7, wherein the metric receiver is configured to receive Input Output Per Second (IOPS) for each storage drive to detect frequency of data manipulation to predict health of each storage drive,
wherein the drive monitor is further configured to:
identify one or more parameters from the plurality of parameters having a value beyond a predefined threshold value; and
generate a plurality of clusters of storage drives from the plurality of storage drives, wherein each cluster comprises the storage drives associated with the identified one or more parameters;
wherein the drive manager further comprises an analyzer configured to:
predict a score for each storage drive in each of the plurality of clusters using a machine learning model, by providing the identified one or more parameters to the machine learning model as input; and
determine the one or more storage drives from the plurality of clusters as unhealthy when the predicted score of the one or more storage drives is beyond a predefined threshold score.

9. The drive manager of claim 8, wherein the drive monitor is further configured to:
determine a plurality of processes in the application that is retrieving the data from the one or more storage drives in the first data retrieval cycle, wherein the plurality of processes is clustered into at least the first set of processes and the second set of processes using Euclidean distance technique;

and wherein the analyzer is further configured to:
identify the association between the first set of processes and the second set of processes, wherein the temporary storage comprises a soft link to associate an outcome of the first set of processes to the second set of processes, wherein the soft link enables the at least one process from the second set of processes to access the data in the temporary storage, wherein the outcome of the first set of processes is a result of executing the application;
recognize the pattern of retrieving the data from the one or more storage drives by the first set of processes for a pre-defined time interval; and
predict the at least one process from the second set of processes using a Long Short-Term Memory (LSTM) model, based on the recognized pattern and the association between the first set of processes and the second set of processes, wherein the at least one process is expected to retrieve the data from the one or more storage devices within the time interval.

10. The drive manager of claim 9, wherein the analyzer identifies the association between the first set of processes and the second set of processes based on a training of the LSTM model, wherein the analyzer is further configured to:
provide a plurality of the first set of processes and the second set of processes; and
generate an update gate vector and a reset gate vector for each of the plurality of the first set of processes and the second set of processes based on a weight associated with each process;
wherein the drive monitor is configured to identify the association between the first set of processes and the corresponding second set of processes based on the update gate vector and the reset gate vector of respective processes.

11. A non-transitory computer readable medium comprising instructions stored thereon that when processed by at least one processor cause a device to perform operations comprising:
receiving a plurality of parameters associated with a plurality of storage drives, each storing data;
identifying an application that is retrieving data from one or more storage drives from the plurality of storage drives in a first data retrieval cycle, when an operational state of the one or more storage drives is determined as unhealthy based on the plurality of parameters;
determining a first set of processes and a second set of processes associated with the application that is retrieving data from the one or more storage drives;
predicting at least one processes from the second set of processes, based on a pattern of retrieving the data from the one or more storage drives by the first set of processes and an association between the first set of processes and the second set of processes, wherein the at least one process indicates a process of the application that is expected to retrieve the data from the one or more storage drives within a time interval;
detecting one or more memory locations in the one or more storage drives from where the predicted at least one process is expected to retrieve the data within the time interval; and
storing the data present in the one or more memory locations in a temporary storage associated with the drive manager, wherein the stored data is provided to the application in a subsequent data retrieval cycle for reducing read operations performed on the one or more storage drives.

12. The non-transitory computer readable medium of claim 11, wherein the plurality of parameters comprises at least one of, Read Error Rate (RER), throughout performance, temperature, Mean Time Between Failures (MTBF), spin-up time, Reallocated Sectors Count (RSC), spin retry count, end-to-end error, current pending sector count, uncorrectable sector count, TA counter detected and Input Output Per Second (IOPS), wherein the Input Output Per Second (IOPS) for each storage drive is received to detect frequency of data manipulation to predict health of each storage drive.

13. The non-transitory computer readable medium of claim 11, wherein the at least one processor further causes the device to perform:
identifying one or more parameters from the plurality of parameters having a value beyond a predefined threshold value;
generating a plurality of clusters of storage drives from the plurality of storage drives, wherein each cluster comprises the storage drives associated with the identified one or more parameters;
predicting a score for each storage drive in each of the plurality of clusters using a machine learning model, by providing the identified one or more parameters to the machine learning model as input; and
determining the one or more storage drives from the plurality of clusters as unhealthy when the predicted score of the one or more storage drives is beyond a predefined threshold score.

14. The non-transitory computer readable medium of claim 11, wherein the at least one processor further causes the device to perform:
determining a plurality of processes in the application that is retrieving the data from the one or more storage drives in the first data retrieval cycle, wherein the plurality of processes is clustered into at least the first set of processes and the second set of processes using Euclidean distance technique;
identifying the association between the first set of processes and the second set of processes;
recognizing the pattern of retrieving the data from the one or more storage drives by the first set of processes for a pre-defined time interval; and
predicting the at least one process, from the second set of processes using a LSTM Model, based on the recognized pattern and the association between the first set of processes and the second set of processes, wherein the at least one process is expected to retrieve the data from the one or more storage devices within the time interval.

15. The non-transitory computer readable medium of claim 14, wherein the at least one processor causes the device to identify the association between the first set of processes and the second set of processes based on a training of the LSTM model, wherein the training includes comprises:
providing a plurality of the first set of processes and the second set of processes;
generating an update gate vector and a reset gate vector for each of the plurality of the first set of processes and the second set of processes based on a weight associated with each process; and
identifying the association between the first set of processes and the corresponding second set of processes based on the update gate vector and the reset gate vector of respective processes.

16. The non-transitory computer readable medium of claim 11, wherein the data in the one or more storage drives from the plurality of storage drives, is stored in the temporary storage when a value of IOPS of a storage drive is greater than a predefined IOPS threshold value.

17. The non-transitory computer readable medium of claim 14, wherein the at least one processor causes the device to create a soft link in the temporary storage to associate an outcome of the first set of processes to the second set of processes, wherein the soft link enables the at least one process from the second set of processes to access the data in the temporary storage, wherein the outcome of the first set of processes is a result of executing the application.

18. The non-transitory computer readable medium of claim 11, wherein the at least one processor causes the device to configure the temporary storage to store de-duplicated data present in a storage drive from the plurality of storage drives when a value of IOPS of the storage drive is greater than a predefined IOPS threshold value.

* * * * *